United States Patent
Keller et al.

(10) Patent No.: US 10,014,581 B2
(45) Date of Patent: Jul. 3, 2018

(54) RADIO FREQUENCY ANISOTROPIC PATCH ANTENNA AND POLARIZATION SELECTIVE SURFACE

(71) Applicant: U.S. Army Research Laboratory, Washington, DC (US)

(72) Inventors: Steven D. Keller, Columbia, MD (US); Amir I. Zaghloul, Bethesda, MD (US)

(73) Assignee: The United States of America as represented by the Secretary of the Army, Washington, DC (US)

( * ) Notice: Subject to any disclaimer, the term of this patent is extended or adjusted under 35 U.S.C. 154(b) by 132 days.

(21) Appl. No.: 14/919,763

(22) Filed: Oct. 22, 2015

(65) Prior Publication Data

US 2016/0126633 A1    May 5, 2016

Related U.S. Application Data

(60) Provisional application No. 62/074,110, filed on Nov. 3, 2014.

(51) Int. Cl.
  *H01Q 9/04* (2006.01)
  *H01Q 1/36* (2006.01)
  *B82Y 10/00* (2011.01)

(52) U.S. Cl.
  CPC ........... *H01Q 9/0457* (2013.01); *H01Q 1/364* (2013.01); *B82Y 10/00* (2013.01); *Y10S 977/742* (2013.01); *Y10S 977/95* (2013.01)

(58) Field of Classification Search
  CPC .... H01Q 9/0407–9/0485; H01Q 1/364; H01Q 1/273; H01Q 1/276
  See application file for complete search history.

(56) References Cited

U.S. PATENT DOCUMENTS

| | | | | |
|---|---|---|---|---|
| 5,923,296 A | * | 7/1999 | Sanzgiri | H01Q 1/246 343/700 MS |
| 7,692,588 B2 | * | 4/2010 | Beer | G01S 7/032 257/690 |
| 7,845,022 B1 | * | 12/2010 | Surve | C23C 4/04 2/243.1 |
| 7,898,481 B2 | * | 3/2011 | Qian | H01Q 1/368 343/700 MS |
| 8,574,673 B2 | | 11/2013 | Rueckes et al. | |
| 8,937,575 B2 | * | 1/2015 | Ward | H01Q 9/0407 343/700 MS |
| 2014/0104136 A1 | | 4/2014 | Werner et al. | |

OTHER PUBLICATIONS

Steven D. Kellet et al., Radiation Performance of Polarization Selective Carbon Nanotube Sheet Patch Antennas, IEEE Transactions on Antennas and Propagation, vol. 62, No. 1, Jan. 2014, USA.

* cited by examiner

*Primary Examiner* — Tho G Phan
*Assistant Examiner* — Patrick Holecek
(74) *Attorney, Agent, or Firm* — Eric Brett Compton

(57) ABSTRACT

A radio frequency patch antenna having a radiator patch constructed of an anisotropic material, such as carbon nanotube sheet material. Such material is flexible so that the antenna may be wearable and/or integrated into a textile substrate. A feed line couples the radio signal to the patch. Furthermore, the efficiency of radiation from the patch is directly related to the orientation of the fibers or carbon nanotubes in the anisotropic material relative to the orientation of the feed line. Dual polarized radiators can be constructed from two orthogonal layers of CNT patches fed with correspondingly orthogonal feed lines.

14 Claims, 4 Drawing Sheets

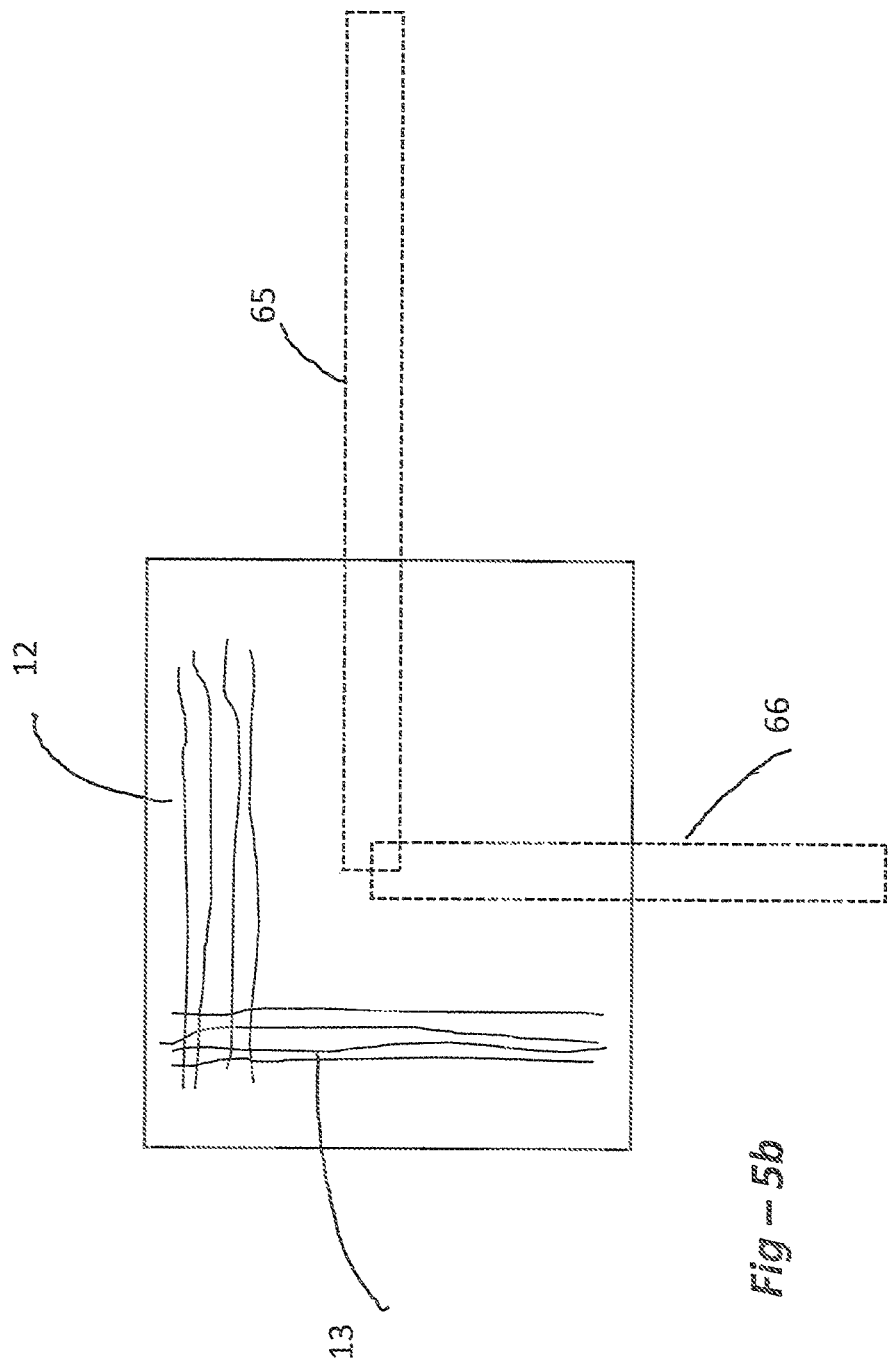

RADIO FREQUENCY ANISOTROPIC PATCH ANTENNA AND POLARIZATION SELECTIVE SURFACE

CROSS REFERENCE TO RELATED APPLICATIONS

This application depends from and claims priority to U.S. Provisional Application No. 62/074,110 filed Nov. 3, 2014, entitled, "Polarization Selective Nanomaterial Antennas," the entire disclosure of which is incorporated herein by reference.

GOVERNMENT INTEREST

The invention described herein may be manufactured, used, and licensed by or for the United States Government.

BACKGROUND OF THE INVENTION

I. Field of the Invention

The present invention relates generally to radio frequency antennas and polarization selective surfaces, more particularly, to a radio frequency patch antenna and surface with anisotropic features constructed, for example, using carbon nanotubes (CNT).

II. Description of Related Art

Solid surface patch antennas derive their polarization status from their feeding mechanism. Both patches and feed lines can be printed on a flexible surface and can be integrated into body worn radio frequency (RF) systems and textile substrates or structures. This presents a variety of design challenges. Antennas fabricated from standard conductive materials such as copper do not have polarization selectivity inherently built into their surface shape or material properties. In addition, they fail to stand up to significant "wear and tear" due to the corrosion, limited flexibility, and lack of durability. Such RF antennas are limited in their placement to areas on the platform such as a helmet, uniform, and equipment pack, that see minimal flexing and bending.

Such patch antennas are typically employed in microwave RF systems, and are sized according to the frequency band.

SUMMARY OF THE PRESENT INVENTION

The present invention provides a radio frequency patch antenna which overcomes the inflexibility of the previously known patch antennas, and introduces an inherent anisotropic conductivity in the surface that makes the antenna aperture polarization selective based upon the orientation of the nanomaterials that comprise the patch.

In brief, the RF patch antenna of the present invention is constructed from an anisotropic material, such as carbon nanotube (CNT) sheet material. Such material is not only flexible, but also durable. As such, it may be incorporated in a wearable RF system, such as the uniform of a soldier or first responder.

The RF patch antenna includes a patch of anisotropic material, such as CNT sheet material, which overlies at least a portion of one side of a first nonconductive substrate. A conductive ground plane overlies the opposite side of the first substrate. The ground plane, in turn, covered by a second nonconductive substrate so that the ground plane is sandwiched in between the first and second substrates with the patch spaced from and substantially parallel to the ground plane.

An RF feed line then extends along the second side of the second substrate. An aperture in the ground plane enables RF energy to couple from the feed line, through the aperture, and to the patch which then emits the RF radio signal. The ground plane and/or the feed line may also be constructed of anisotropic material, such as CNT sheet material, aligned with the direction of the patch antenna material.

The orientation of the anisotropic material relative to the orientation of the feed line significantly affects not only the resonance of the patch antenna, but also the efficiency of transmission from the feed line to the patch. In particular, when the fibers or carbon nanotubes are aligned in the same direction as the feed line, the transmission of RF energy from the patch approaches the same efficiency of a patch constructed of a non-anisotropic material, such as copper. The efficiency of the co-aligned feed line and patch fibers increases with increasing the thickness or number of CNT layers that make up the patch, with the efficiency approaching the copper patch for thicker CNT patches. Post-process treatments such as sparse metallic nanoparticle seeding can also be applied to increase the efficiency of the co-aligned feed line and patch fibers without affecting its anisotropic properties. Conversely, when the fibers or carbon nanotubes of the patch are aligned in a direction perpendicular to the direction of the feed line, the transmission efficiency of the patch is substantially less than the efficiency of a patch antenna in which the patch is constructed of a non-anisotropic material, such as copper. Furthermore, the actual resonant frequency of the patch constructed of the anisotropic material varies depending upon the orientation of the feed line.

The relationship of the orientation of the feed line relative to the orientation of the fibers or carbon nanotubes of the patch can be employed to reuse the same patch area to operate at two orthogonal polarizations at the same frequency band, or at two separate bands. Two RF antenna systems may be contained on the same body worn RF system.

The CNT threads can also be used to construct a lightweight surface to produce polarization selectivity for reflection and transmission. This can be a single polarization surface or two orthogonal-polarization surfaces.

BRIEF DESCRIPTION OF THE DRAWING

A better understanding of the present invention will be had upon reference to the following detailed description when read in conjunction with the accompanying drawing, wherein like reference characters refer to like parts throughout the several views, and in which:

FIG. 5b is a view similar to FIG. 1 but showing two orthogonally arranged antennas.

DETAILED DESCRIPTION OF A PREFERRED EMBODIMENT OF THE PRESENT INVENTION

Figure 1:
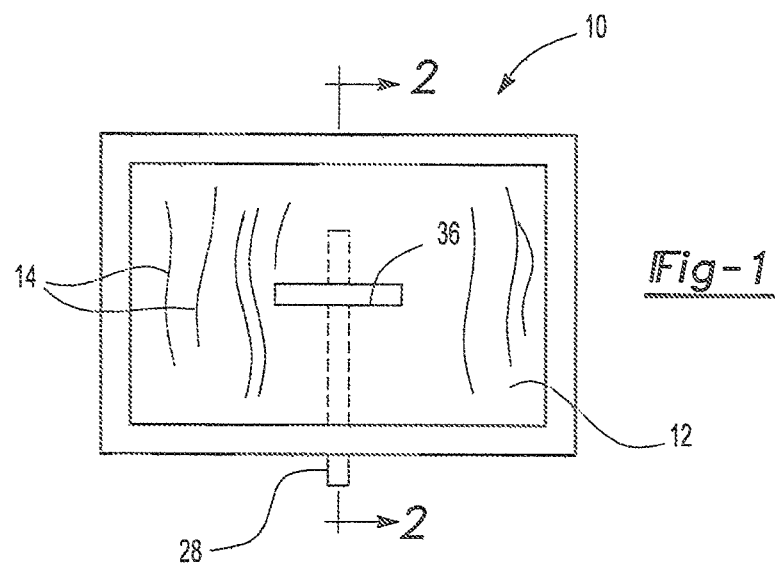
FIG. 1 is a top plan view showing an RF patch antenna.
Figure 2:
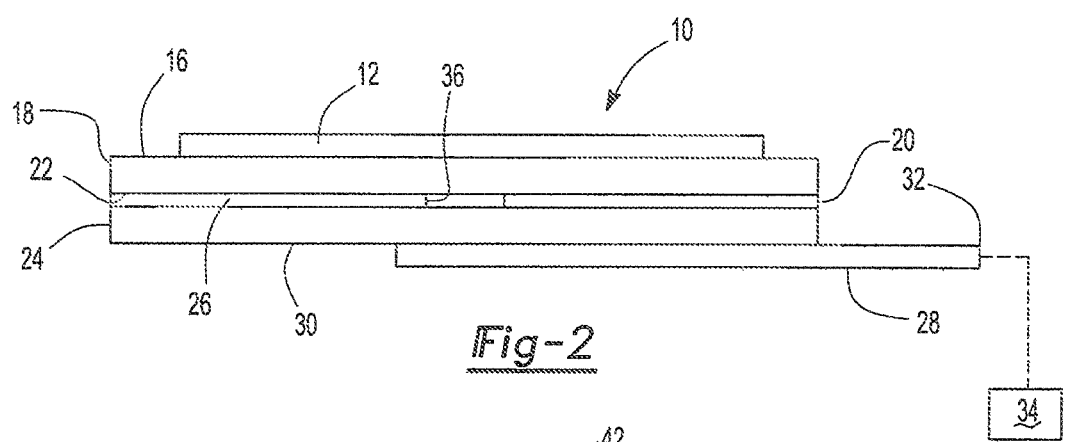
FIG. 2 is a sectional view taken substantially along line 2-2 in FIG. 1 and enlarged for clarity.

With reference first to FIGS. 1 and 2, an RF patch antenna 10 according to the present invention is illustrated. The patch antenna 10 typically operates at relatively high frequencies, such as the X band, although other frequencies may be used without deviation from the spirit or scope of the invention. Furthermore, in microwave RF antenna systems, such as the X band, a single antenna may be formed by a series of patch antennas 10. The use of a plurality of patches allows steering of the RF system using conventional techniques, such as phase shifting of the signal provided to the various patch antennae.

The patch antenna 10 includes an upper patch 12 constructed of an anisotropic material. Preferably, the anisotropic material comprises carbon nanotube sheet material. Such CNT sheet material includes carbon nanotubes 14 which are aligned in substantially the same direction. Preferably, the patch 12 has a thickness, typically between 0.5 micrometers and 5 micrometers and can be outside this range, and is about 1-2 centimeter square for operation in the X-band. The dimensions of the patch 12 will vary depending upon the radio frequency of the patch antenna 10 as well as other factors, including the electrical properties of the upper substrate 18 and lower substrate 24.

The patch 12 overlies an upper surface 16 of a first substrate 18. The first substrate 18 is constructed of any conventional nonconductive material.

A conductive ground plane 20 overlies the bottom side 22 of the first substrate 18. A second substrate 24 then covers the conductive ground plane 20 so that the conductive ground plane 20 is sandwiched in between the upper substrate 18 and the lower substrate 24. The ground plane 20 is preferably a copper coating applied to either the bottom 22 of the upper substrate 18 or a top 26 of the lower substrate 24.

Still referring to FIGS. 1 and 2, a conductive feed line 28 is applied to a portion of a bottom side 30 of the second substrate 24. This feed line 28 includes an end 32 which is conductively coupled to a transmitter/receiver 34 of the RF energy.

In order to couple the feed line 28 to the patch 12, an aperture 36 is formed through the ground plane 20. Furthermore, the dimensions and other specifications of both the feed line 28 and aperture 36 are conventional and will vary depending upon the radio frequency of the patch antenna 10 as well as other factors, including the electrical properties of the upper substrate 18 and lower substrate 24.

Figure 3:
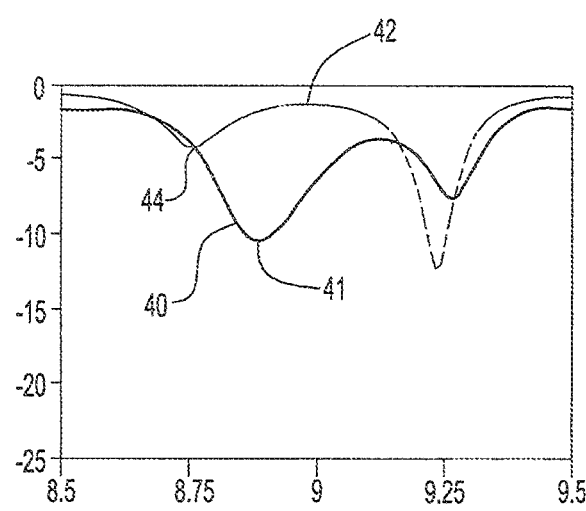
FIG. 3 is a graph illustrating both the resonant frequency as well as reflection coefficient of the RF CNT patch antennas when fed with aligned and orthogonal feed lines relative to the CNT threads that make the patch.

It has been found that the orientation of the carbon nanotubes 14 relative to the orientation of the longitudinal axis of the feed line 28 affects not only the efficiency of transmission of the patch antenna 10, but also its resonance. With reference then to FIG. 3, graph 40 illustrates the reflection coefficient, represented by the return loss $S_{11}$ (dB), of the patch antenna 10 as a function of frequency when the carbon nanotubes 14 are aligned with the feed line 28. As shown, the graph 40 has a resonance at 41 of about 8.8 GHz and a return loss of about −12 dB.

Conversely, a graph 42 illustrates the reflection coefficient performance of the patch antenna 10 when the carbon nanotubes 14 are oriented perpendicular to the orientation of the feed line 28. As shown in FIG. 3, in this configuration the patch antenna 10 illustrates a relatively large return loss $S_{11}$ of −4 dB at 44. As such the efficiency of the patch antenna 10 is greatly diminished when the carbon nanotubes 14 are oriented perpendicular or orthogonal to the feed line 28 than when the carbon nanotubes 14 are oriented parallel to the feed line 28.

Figure 4:
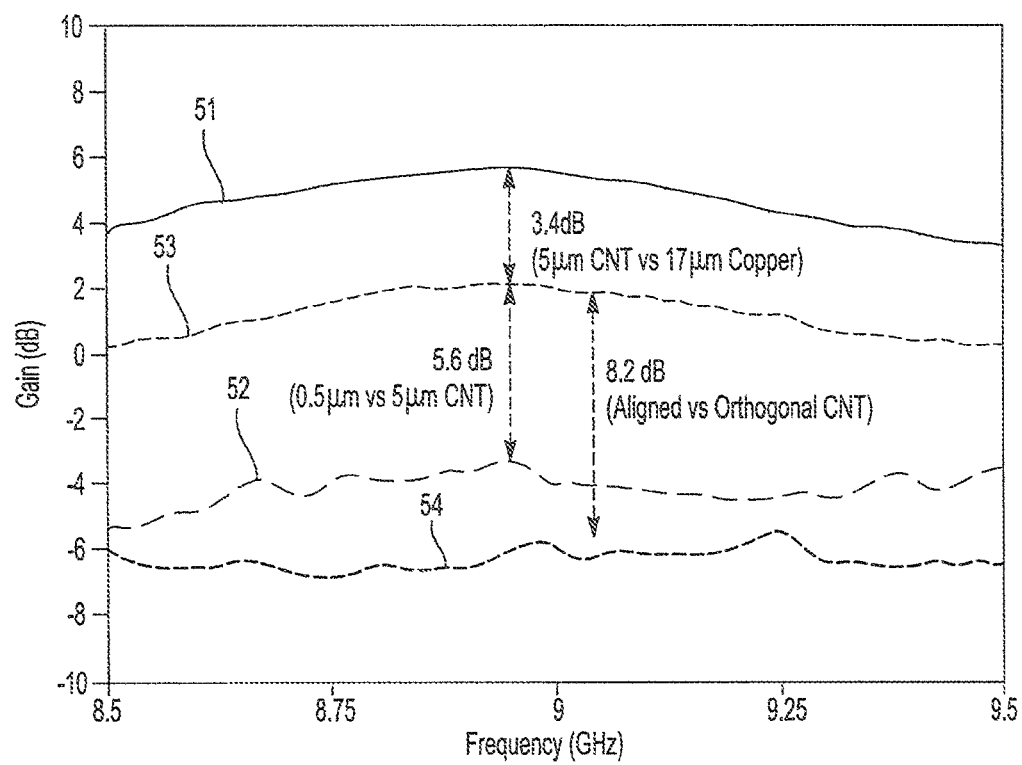
FIG. 4 is a graph showing the gain of the CNT patch antenna with two thicknesses for co-aligned and orthogonal feeding as compared to solid copper patch antenna.

This is illustrated further in FIG. 4, which shows the gain of the patch antenna under different conditions: using a copper surface 51, using a 0.5-micrometer thick CNT surface 52, and using 5-micrometer thick CNT surface 53. Feeding the 5-micrometer thick CNT patch in a direction orthogonal to the CNT direction is also shown 54.

The difference in transmission efficiency, as well as possible difference in the resonant frequency, depending upon the orientation of the carbon nanotubes 14 relative to the feed line 28 enables two separate antenna systems to be mounted on the same platform, e.g. a warfighter's uniform, and in which the two antenna systems may be simultaneously utilized in the same physical area without significant cross interference. This is accomplished by merely rotating one antenna 90 degrees relative to the other antenna, separating the two antennas by a layer of dielectric material, and feeding them with correspondingly two orthogonal feeds, also separated by a layer of dielectric layer. Additionally, this result enables reduced mutual coupling between neighboring antenna elements which CNT lines are oriented orthogonal to each other. This facilitates re-using the frequency band for the co-located antennas.

The concept of using anisotropic CNT surfaces for polarization isolation of two patches can also be employed for orthogonally polarized surfaces, such as reflectors, with corresponding orthogonally polarized feeds, to re-use the frequency band for two radiating systems.

Figure 5A:
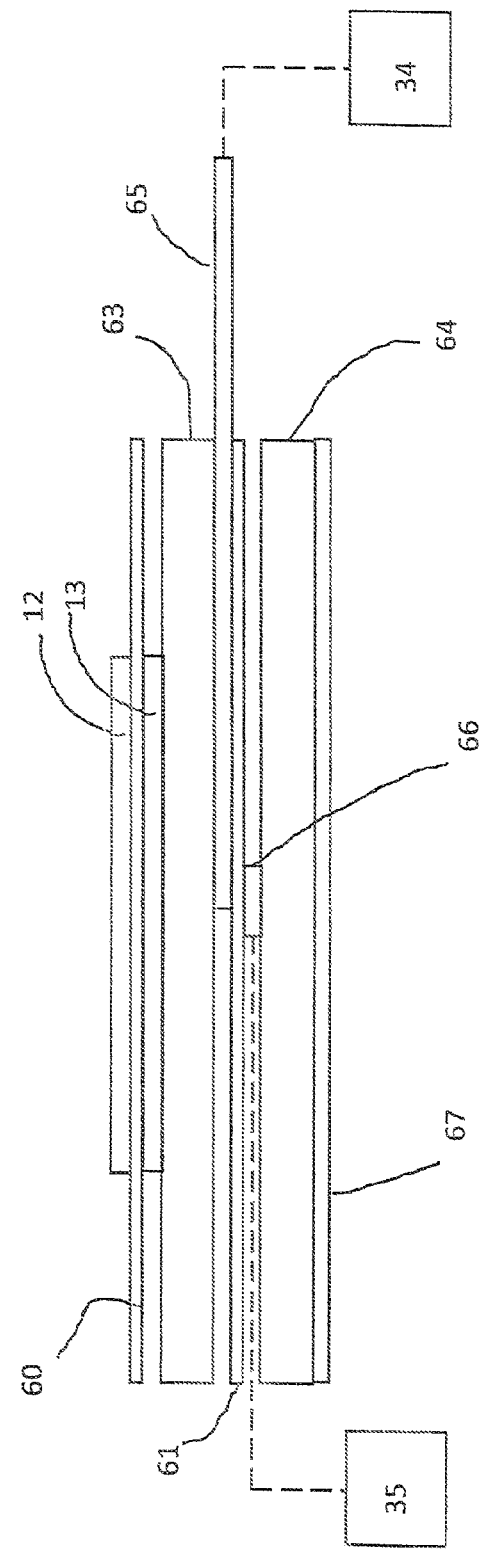
FIG. 5a is a cross-sectional view showing two orthogonally arranged patch antennas.

For example, see FIGS. 5a and 5b in which two CNT patches 12 and 13 are in alignment with each other and separated by a thin, non-conductive substrate 60. As shown in FIG. 5b, the CNTs for the two patches 12 and 13 are orthogonal or perpendicular to each other.

The patches 12 and 13 overlie both an upper substrate 63 and a lower substrate 64 which are separated from each other by a thin substrate 61. A first feed line 65 oriented in the same direction as the CNTs in the patch 12 conducts the signal from the first transmitter/receiver 34 to the upper CNT patch 12. Similarly, a second feed line 66 oriented in the same direction as the CNTs in the patch 13 conducts the signal from a second transmitter/receiver 35 to the lower CNT patch 13.

The upper substrate 63 is associated with the first feed line 65 and the lower substrate is associated with the second feed line 66. A conductive ground plane 67 underlies the patches 12 and 13 as well as the substrates 63 and 64 and the feed lines 65 and 66.

However, since the patches 12 and 13 and their respective feed lines are orthogonal, both patch antennae may be simultaneously used with minimal cross interference.

From the foregoing, it can be seen that the present invention provides a patch antenna which may be body worn, or mounted on a different platform, which is not only durable and efficient in operation, but also enables two separate antenna systems to be mounted on the same platform. Having described our invention, however, many modifications thereto will become apparent to those skilled in the art to which it pertains without deviation from the spirit of the invention as defined by the scope of the appended claims.

We claim:

1. A radio frequency antenna comprising:
a radiator patch constructed of an anisotropic material, wherein the orientation of the anisotropic material is permanent with respect to the patch so as define a fixed polarization selectivity direction of the radiator patch,
a feed line for coupling a radio signal to said patch,
wherein said patch comprises a carbon nanotube sheet material, and
wherein nanotubes in said nanotube sheet material are substantially aligned with said polarization selectivity direction and wherein said feed line is substantially parallel to said polarization selectivity direction.

2. The antenna as defined in claim 1 wherein said nanotube sheet material is flexible.

3. The antenna as defined in claim 1 wherein said patch is attached to a textile substrate.

4. The antenna as defined in claim 3 wherein said patch is a part of said textile substrate.

5. The antenna as defined in claim 1 wherein said patch is mounted on one side of a planar nonconductive substrate, a conductive ground plane is mounted on a second side of said substrate and said feed line is coupled to said patch through an opening in said ground plane.

6. The antenna as defined in claim 5 and comprising a second nonconductive substrate between said feed line and said patch.

7. The antenna as defined in claim 1 and comprising a second patch constructed of an anisotropic material having a polarization selectivity direction orthogonal to said first mentioned direction, a second feed line for coupling a radio signal to said second patch, said feed lines being disposed substantially perpendicular to each other and said patches of anisotropic materials being disposed substantially perpendicular to each other.

8. The antenna as defined in claim 1 wherein nanotubes in said nanotube sheet material are substantially aligned with said polarization selectivity direction and wherein said feed line is substantially orthogonal to said polarization selectivity direction.

9. The antenna as defined in claim 5 wherein the opening in the ground plane is orthogonal to the feed line.

10. A radio frequency antenna comprising:
a first radiator patch constructed of an anisotropic material, wherein the orientation of the anisotropic material is permanent with respect to the first radiator patch so as define a fixed first polarization selectivity direction of the first radiator patch,
a first feed line for coupling a radio signal to said first patch,
a second radiator patch constructed of an anisotropic material, wherein the orientation of the anisotropic material is permanent with respect to the second radiator patch so as define a fixed second polarization selectivity direction of the second radiator patch, said second direction being orthogonal to said first direction,
one of said patches overlying the other patch,
a second feed line for coupling a radio signal to said patch,
wherein each said patch comprises a carbon nanotube sheet material, and
wherein nanotubes in said first patch are substantially aligned in a first direction and wherein said first feed line is substantially parallel to said first direction, wherein nanotubes in said second patch are substantially aligned in a second direction orthogonal to said first direction and wherein said second feed line is substantially parallel to said second direction.

11. The antenna as defined in claim 10 wherein said nanotube sheet material is flexible.

12. The antenna as defined in claim 10 wherein said patch is attached to a textile substrate.

13. The antenna as defined in claim 12 wherein said patch is a part of said textile substrate.

14. The antenna as defined in claim 10 wherein each said patch is mounted on one side of a planar nonconductive substrate, a conductive ground plane is mounted on a second side of said substrate and each said feed line is coupled to each said patch through an opening in said ground plane.

* * * * *